United States Patent
Ijntema

(10) Patent No.: US 6,369,810 B1
(45) Date of Patent: Apr. 9, 2002

(54) DIGITAL MONITOR

(75) Inventor: Dominicus J. Ijntema, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/120,626

(22) Filed: Jul. 22, 1998

(30) Foreign Application Priority Data

Jul. 25, 1997 (EP) .............................. 97202341

(51) Int. Cl.$^7$ ................................. G09G 5/00
(52) U.S. Cl. ...................... 345/214; 345/204; 345/42
(58) Field of Search .................. 345/1.2, 3.1, 204, 345/42, 214, 150, 153

(56) References Cited

U.S. PATENT DOCUMENTS

| | | | | |
|---|---|---|---|---|
| 4,030,119 A | * | 6/1977 | Ellis ............................... 378/4 |
| 4,857,899 A | * | 8/1989 | Ishii ............................ 345/150 |
| 4,992,706 A | * | 2/1991 | Troemel et al. ......... 315/368.12 |
| 5,150,458 A | * | 9/1992 | Masuzaki et al. ............ 345/435 |
| 5,270,821 A | * | 12/1993 | Samuels ...................... 348/552 |
| 5,371,537 A | * | 12/1994 | Bohan et al. ................ 348/181 |
| 5,384,861 A | * | 1/1995 | Mattson ...................... 382/131 |
| 5,485,215 A | * | 1/1996 | Meyer et al. ................ 348/432 |
| 5,512,961 A | * | 4/1996 | Cappels, Sr. ................. 348/658 |
| 5,828,351 A | * | 10/1998 | Wu .............................. 345/11 |
| 5,949,496 A | * | 9/1999 | Kim ............................ 348/645 |
| 6,078,301 A | * | 6/2000 | Arai et al. ..................... 345/10 |

* cited by examiner

Primary Examiner—Chanh Nguyen
Assistant Examiner—Fritz Alphonse
(74) Attorney, Agent, or Firm—Edward W. Goodman

(57) ABSTRACT

In a system like a PC, the function of a graphics card is included with the monitor. A processor sends update signals to the monitor to modify image content. The graphics card processes the update signals and applies corrections to the updates to correct for physical imperfections of imaging process of the monitor. The graphic card writes the results into an image memory. The content of the image memory is used to drive the monitor.

4 Claims, 1 Drawing Sheet

DIGITAL MONITOR

BACKGROUND OF THE INVENTION

1. Field of the Invention

The invention relates to an image display device comprising an input for receiving an image update signal; an image memory for storing image information; a processing circuit coupled to the input and the image memory, for effecting a modification of a part of the image information stored in the image memory and affected by the image update signal; and a display unit coupled to the image memory, for displaying an image according to the image information.

2. Description of the Related Art

Such an image display device is used, for example, with a personal computer (PC). The PC contains a CPU and a graphics card, for example a so-called VGA card, coupled to a display unit. In operation, the CPU sends image update signals to the graphics card, for example, a signal to update the color value of a pixel, or to draw a line with a certain color, or to update the color values in a rectangular window. The graphics card contains an image memory in which information representing an image is stored, usually with individual memory locations containing pixel values for individual pixels. Each time the graphics card receives an update signal, it processes this update signal and modifies the information in the image memory according to the update signal, for example, by replacing a single pixel value, or replacing pixel values along a line or in a rectangular window. The graphics card periodically outputs an image signal derived from the image information from the image memory to the display unit.

The display unit periodically receives the image signal and converts the image signal into control signals with which the light output of individual pixels is controlled. Corrections are applied which depend on the physical properties of display unit, changes in the settings of the control organs of the display unit, etc. Such corrections are transparent to the CPU which produces updates that are valid for any type of display unit with any setting. The corrections range from simple corrections, for example, to account for the brightness, contrast and saturation setting of the display unit, to more complicated corrections, for example, to correct for beam repulsion effects, convergence errors and cathode drive modulation effects in a cathode ray tube or to suppress Moiréeffects caused by the display raster.

It would be desirable if it were possible to convert the image signal into control signals performing many of these corrections digitally. However, performing too many corrections digitally would require an extreme amount of processing power, especially for high resolution display units.

SUMMARY OF THE INVENTION

It is an object of the invention to provide and image display apparatus in which the need for processing power to apply display unit dependent corrections to the image information is reduced.

According to the invention, the image display apparatus is characterized in that the processing circuit is arranged to generate the modification dependent on a display unit dependent correction. Effectively, this places the graphics card logically together with the display unit in a single monitor, allowing the monitor to apply the display unit dependent corrections to the update signals received from the CPU before the image information in the memory is modified rather than after modification when the image information is outputted from the image memory to the display unit. Of course, some corrections that require little processing time may still be applied to the image signal output from the image memory to the display unit.

An update signal affects only part of the image and the amount of information in the update signals per unit time is usually much lower than that in the image signal output from the image memory per unit time. This means that a relatively low speed processing circuit (preferably a digital signal processor) usually suffices to apply the display unit dependent corrections.

An embodiment of the image display apparatus according to the invention is characterized in that the processing circuit is arranged to generate, normally, the modification dependent on the display unit dependent correction and on a further display unit dependent correction, the processing circuit being arranged to detect whether or not there is sufficient time to generate the modification dependent on both display unit dependent corrections, and if not to effect the modification of the image information in the image memory without accounting for the further display unit dependent correction. In this embodiment, the processing circuit is able to apply at least two corrections when it modifies the image information, for example, a correction to account for brightness setting and a correction to suppress Moiréeffect. When the processing circuit has sufficient time, both corrections are applied before the modification of the image information is effected. However, when there is not enough time, for example, because a large number of update signals has to be processed, one of the corrections is not applied, preferably, the correction of the effect that is generally least visible, or least visible in dynamic images.

A further embodiment of the image display apparatus according to the invention is characterized in that the image display apparatus comprises a correction table memory for storing information about whether or not the modification has been generated dependent on the further display unit dependent correction, the processing circuit being arranged to effect a further modification of the image information in the image memory responsive to the image update signal and generated dependent on the further display unit dependent correction, when the processing circuit has sufficient time to generate the further correction. In this way, the modification that has been effected in the image memory without accounting for a correction is corrected later when there is sufficient time.

An embodiment of the image display apparatus according to the invention is characterized in that the image display apparatus comprises a look-up memory for storing a set of corrected color values corresponding to respective input color values from a subset of colors that the display unit is capable of displaying, the processing circuit being arranged to generate the modification by reference to the color look-up memory in case the modification involves an input value for which a corrected color value is stored, and by computation otherwise. In this way, renewed computation of corrected modifications is avoided, reducing the required amount of processing.

A further embodiment of the image display apparatus according to the invention is characterized in that the image display apparatus comprises means for analyzing the image information so as to determine a set of most frequent input color values, said means updating the color look-up memory so that the color look-up memory contains corrected color values for said most frequent input color values. Thus, the apparatus is capable of optimizing its speed adaptively dependent on the statistics of the image. Usually the selected most frequent input colors will correspond to individual colors used for various interface item in a color scheme selected by the operating system running on the CPU. When the user switches to another color scheme, the image display apparatus will thus adapt itself to that other color scheme.

An embodiment of the image display apparatus according to the invention is characterized in that the image display apparatus comprises a further image memory for storing further image information, and means for effecting a further modification of a part of the further image information stored in the image memory and affected by the image update signal, the further modification being generated without accounting for said display unit dependent correction, the processing circuit generating the modification dependent on the update signal, the further image information and the display unit dependent correction. Thus, two image memories are used, one for uncorrected image information and one for corrected image information. The image memory for uncorrected image information is used for corrections where uncorrected pixel values are needed, such as, operations upon a pixel that need information about adjacent pixels, e.g., n-tap filter operations for interpolation, correction of convergence errors, Moiré suppression, bit block transfer functions.

The invention is especially advantageous when the display unit uses a CRT (cathode ray tube), because a CRT requires a considerable number of corrections for high quality image display.

BRIEF DESCRIPTION OF THE DRAWING

These and other advantageous aspects of the image display apparatus according to the invention will described further using the attached drawing; in which.

DESCRIPTION OF THE PREFERRED EMBODIMENTS

Figure 1:
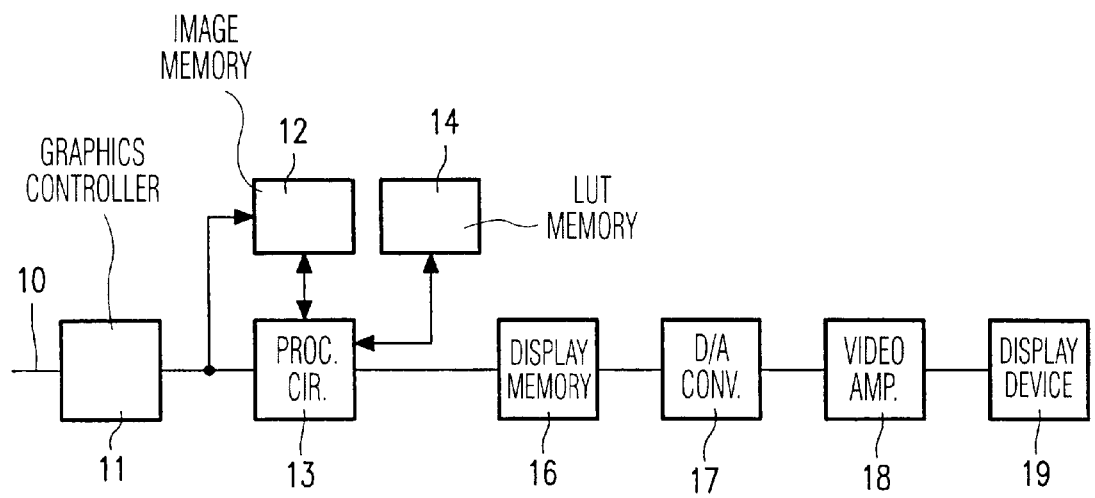
FIG. 1 shows an image display apparatus according to the invention.

FIG. 1 shows an image display apparatus according to the invention. The apparatus has an input 10 coupled to a graphics controller 11. The graphics controller 11 has an output coupled to an uncorrected image memory 12 and a processing circuit 13. The processing circuit 13 is coupled to the uncorrected image memory 12 and to a look-up table memory 14. The processing circuit 13 has an output connected to a display memory 16. The display memory 16 has an output coupled, for example, to a cascade of digital-to-analog converters (DACs) 17, video amplifiers 18 and a display device 19, such as, a CRT.

In operation, the display memory 16 stores a representation of an image, e.g., three values for each pixel of the image representing primary color intensities. The image is displayed on the display device 19 in successive frame periods at a frame rate of, e.g., 70 frames per second. For this purpose, the representation is read from the display memory 16 once for each frame period and converted into control signals for the display device 19, for example, by reading a predetermined sequence of locations from the display memory 16 and converting the pixel values read out from successive locations in this sequence into time and image content dependent cathode or grid voltages for the grids of a CRT.

Separate from the display process, the graphics controller 11 receives update commands. An update command specifies, for example, that a pixel in the displayed image should be modified, keeping the remainder of the displayed image the same, or that pixels along a line in the displayed image should be modified keeping the remainder of the displayed image the same, or that pixels in an area (window) of the displayed image should be modified keeping the remainder of the displayed image the same. Commands can also affect the entire image, e.g., when the image should be cleared.

The graphics controller 11 passes the update commands to the processing circuit 13, preferably split into updates for individual pixels in the displayed image. The processing circuit 13 computes how the content of the display memory 16 should be altered so that the cascade of DACs 17 and video amplifiers 18 produces control signals that cause the display device 19 to display the image as commanded by the update commands. In this computation, the processing circuit 13 accounts for at least some of the particular properties of the image display device 19 such as, for example, the interactions between pixels of the image. Thus, an equivalent update commands, like "draw a line of a given length", will not invariably result in identical changes in the content of the display memory 16, but rather the content of the display memory 16 will, each time, be given such a value that the resulting control signals will result in the display of the image equivalently altered according to the update command. Given the display dependent effect that the processing circuit compensates for, the actual pixel values written into the display memory 16 in response to equivalent update commands may differ depending on, for example:

the position on the display screen of the pixels affected by the update command, and/or the image context in which these pixels occur and/or the given setting of the display device.

For example, in case a CRT is used as a display device, effects like raster deformation, repulsion between the electron beams, convergence errors, cathode drive modulation and Moiré effects may occur. Ideally, a CRT would be a device on which one could produce light emission with intensity I at a position with coordinates x,y on a plane with rectangular coordinates simply by driving the CRT with an x-signal, a y-signal and an I-signal. The above-mentioned effects, which are known per se and can be predicted using models, simulation or measurements, constitute deviations from this ideal. Due to raster deformations, like cushion shape deformation, straight lines appear on the display screen with a curvature depending on their position on the display screen. Due to repulsion between the electron beams (e.g., red green and blue beams), if one beam has a high current, then electrons from the other beams may be repulsed by that beam, so that they land at the wrong place on the display screen. This effect depends on the image content and on the brightness, etc., setting of the display screen. Due to convergence errors, beams may land at the wrong color phosphor dependent on the location in the image. Due to cathode drive modulation, a beam will be accelerated less when it is less intensive, so that it will be deflected more on its way to the display screen, causing it to land at the wrong place. This effect also depends on the content of the image and the settings of the display screen. Moiré effects are caused by spatial aliasing of the image signal with the discrete shadowmask grid. This effect depends on the content of the image.

Effects like raster deformation and convergence errors are usually compensated for by means of correction coils, but this provides only a coarse correction which is unsatisfactory for high quality monitors and involves costs for additional coils. According to the invention, at least a number of these or other display-device dependent effects are compensated for by the processing circuit 13. Thus, the information in the display memory 16 that is to be read for display on the display device 19 is corrected so that when the content of the display memory 16 is used to drive the display device, this results in the image intended by the update commands. Other effect may still be compensated for by conventional means, such as, correction coils or appropriate design of the video amplifiers 20.

For example, to compensate for raster deformation, beam repulsion, convergence errors and cathode drive modulation, the processing circuit 13 selects the location in which an update command is effected in the display memory 16. The selected location does not follow solely from the update command, but a location is selected that is shifted with respect to the location which follows from the command by itself, the shift being chosen so that on the display, these effects will be compensated for, for example, in a first approximation, the shift is the opposite of the predicted shift due to these effects. Also to compensate for these effects, a change in memory content that, according to the command, affects only one pixel may be spread out over more than one memory location. For this purpose, one preferably uses a display memory 16 that has a higher resolution than the display device 19 (or the resolution at which the update commands are expressed), so that appropriate shifts of less than an entire pixel on the display device 19 can be represented and supplied to the drive input of the display device 19.

The shift can be determined, for example, by providing the processing circuit with a table or expressions that assign an experimentally optimized shift and/or a spread profile to any given combination of pixel location and pixel intensity at or around that location, which has been experimentally found to minimize the visible deformation effects. Given the location and intensity of the updated pixels, the required shift and/or spread, the processing circuit can then look up or compute the required shift.

Similarly, the update command may be effected so that the display memory 16 receives a spatially low-pass filtered version of the image commanded by the update command, in order to prevent Moiré effects.

Compensation of some of the above-mentioned effects requires information about pixel values of pixels in the neighborhood of the pixels that should be altered according to the update commands. For some operations, e.g., to affect a change in contrast setting or Moiré filtering, this information is preferably made available to the processing circuit 13 without prior compensation for display device 19 dependent effects. For this purpose, the apparatus contains, in addition to the display memory 16, an uncorrected image memory 12 in which the graphics controller 11 writes updates following from update commands without display device dependent corrections. The processing circuit 13 may then consult the uncorrected image memory 12 to compute the corrections.

In a computer-generated image, a small set of colors and color combinations occur very frequently. For example, the operating system of the computer may use a color scheme which specifies standard colors for certain items in the image, such as, the background or a bar on top of a window with information, etc. Such items are represented with standard colors (herein the word "color" is used to refer, for example, to an RGB signal triple, i.e., it includes brightness). As a result, the update commands received via the input 10 will very often use colors from this small set.

In order to speed up compensation, the processing circuit 13 preferably stores a table with compensated color values for each of the colors from the small set. Upon receiving an update and when it executes corrections for certain effects, the processing circuit 13 determines whether the update involves a color from the small set and, in that case reads the compensated color value from the table, without incurring the delay of a renewed computation. Thus, correction of, for example, brightness, contrast or gamma effects for pixels with a color from the small set takes very little time.

Some operating systems do not have a predetermined color scheme or are capable of changing their color scheme. In order to make the processing circuit 13 independent of this, the processing circuit 13 preferably repeatedly counts the frequency with which colors are used in update commands or in the image and keeps compensated color values for the most frequently used colors. Thus, the content of the table will be adapted to the color scheme used by the operating system.

The computation of the way an update command should affect the content of the display memory 16 to correct for various effects can be very processing intensive, because the alterations in the content of the display memory usually involves not only the pixels on the display screen of the display device 19 that are visually affected by the update command, but also neighborhood pixels. However, the computation is performed only for updates and not for the entire image each time a new frame is displayed. Therefore, a relatively low power processing circuit 13 may be used. Update commands may be queued while the processing circuit 13 is processing preceding commands. Usually, the queue will be very small because the average rate at which update commands arrive is low in comparison to the rate at which data is read from the display memory 16 for display.

Under some circumstances, the delay caused by the computation may lead to undesirable visual effects, in particular, when there is a burst of update commands that must be executed. This may be prevented by postponing correction of some the effects until the number of incoming update commands diminishes. Preferably, correction of those effects is postponed that are least visible in rapidly changing images, for example, effects that affect the straightness of lines. Preferably brightness, contrast, gamma corrections are executed with highest priority and Moiré beam repulsion and convergence corrections are executed with a lower priority.

Figure 2:
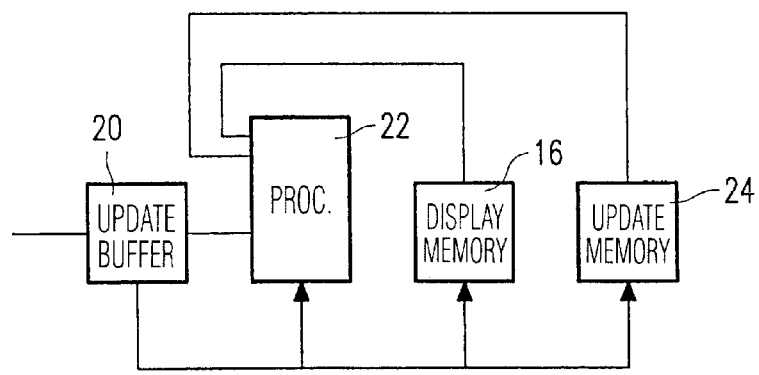
FIG. 2 shows an embodiment of the processing circuit.

FIG. 2 shows an embodiment of the processing circuit 13 that makes it possible to postpone corrections. In this embodiment, the processing circuit comprises a processor 22, and an update buffer 20 located between the graphics controller (not shown) and the processor 22. The processor is coupled to the display memory 16 and an update memory 24. The buffer memory has a "(imminent) buffer full" output coupled to the processor 22 and the update memory 24.

In operation, update commands are queued in the update buffer 20 before they are passed to the processor 22. The processor 22 receives the update commands from the update buffer 20 and computes the alterations needed to the contents of the display memory 16 in order to effect the update commands and compensate for various display dependent effects. When update commands arrive at a higher rate than they are handled by the processor 22, the number of update commands queued in the update buffer 20 will grow. When this number exceeds a threshold (of, say, 50% of the buffer capacity) the update buffer 20 will supply the "buffer full" signal to the processor 22 and the update memory 24. In response, the processor 22 will store information at a location in the display, memory 16 without correction for some of the display dependent effects. At the same time, information will be stored in the update memory indicating that such uncorrected information has been stored at that location. At a later time when the update buffer 20 no longer signals (imminent) buffer full, the processor 22 consults the update memory 24 and belatedly performs the correction that it has omitted, storing corrected information in the display memory and recording this in the update memory 24.

What is claimed is:

1. An image display apparatus comprising:

an input for receiving an image update signal;

an image memory for storing image information;

a processing circuit, coupled to the input and the image memory, for effecting a modification of a part of the image information stored in the image memory and affected by the image update signal; and a display unit, coupled to the image memory, for displaying an image according to the image information, characterized in that the processing circuit generates the modification dependent on a display unit dependent correction, wherein the processing circuit generates, normally, the modification dependent on the display unit dependent correction and on a further display unit dependent correction, the processing circuit detecting whether or not there is sufficient time to generate the modification dependent on both display unit dependent corrections, and if not, effects the modification of the image information in the image memory without accounting for the further display unit dependent correction.

2. The image display apparatus as claimed in claim 1, wherein said image display apparatus further comprises a correction table memory for storing information about whether or not the modification has been generated dependent on the further display unit dependent correction, the processing circuit effecting a further modification of the image information in the image memory responsive to the image update signal and generated dependent on the further display unit dependent correction, when the processing circuit has sufficient time to generate the further correction.

3. The image display apparatus as claimed in claim 1, wherein said image display apparatus further comprises a look-up memory for storing a set of corrected color values corresponding to respective input color values from a subset of colors that the display unit is capable of displaying, the processing circuit generating the modification by reference to the color look-up memory in case the modification involves an input value for which a corrected color value is stored in the look-up memory, and by computation otherwise.

4. The image display apparatus as claimed in claim 3, wherein said image display apparatus further comprises means for analyzing the image information to determine a set of most frequent input color values, said analyzing means updating the look-up memory so that the look-up memory contains corrected color values for said most frequent input color values.

* * * * *